US012555565B2

(12) United States Patent
Wang et al.

(10) Patent No.: US 12,555,565 B2
(45) Date of Patent: Feb. 17, 2026

(54) DEVICE AND METHOD WITH TARGET SPEAKER IDENTIFICATION

(71) Applicant: Samsung Electronics Co., Ltd., Suwon-si (KR)

(72) Inventors: Kai Wang, Xi'an (CN); Xiaolei Zhang, Xi'an (CN); Miao Zhang, Xi'an (CN)

(73) Assignee: Samsung Electronics Co., Ltd., Suwon-si (KR)

(*) Notice: Subject to any disclaimer, the term of this patent is extended or adjusted under 35 U.S.C. 154(b) by 305 days.

(21) Appl. No.: 17/951,585

(22) Filed: Sep. 23, 2022

(65) Prior Publication Data
US 2023/0100259 A1 Mar. 30, 2023

(30) Foreign Application Priority Data

Sep. 30, 2021 (CN) .......................... 202111164838.0
Jul. 6, 2022 (KR) ........................ 10-2022-0083342

(51) Int. Cl.
G10L 25/30 (2013.01)
G10L 15/02 (2006.01)
G10L 17/00 (2013.01)
G10L 25/51 (2013.01)
G10L 25/78 (2013.01)

(52) U.S. Cl.
CPC .............. *G10L 15/02* (2013.01); *G10L 25/30* (2013.01); *G10L 25/51* (2013.01); *G10L 25/78* (2013.01)

(58) Field of Classification Search
CPC ................................ G10L 17/00; G10L 17/18
See application file for complete search history.

(56) References Cited

U.S. PATENT DOCUMENTS

| 9,818,431 | B2 | 11/2017 | Yu |
| 11,031,017 | B2 | 6/2021 | Wang et al. |
| 2018/0075849 | A1* | 3/2018 | Khoury .................. G10L 17/04 |
| 2019/0156837 | A1* | 5/2019 | Park ....................... G10L 17/18 |
| 2019/0356905 | A1 | 11/2019 | Godard et al. |

(Continued)

FOREIGN PATENT DOCUMENTS

| CN | 111341325 A | 6/2020 |
| CN | 112071325 A | 12/2020 |

(Continued)

OTHER PUBLICATIONS

Xu, Chenglin, et al. "Target speaker verification with selective auditory attention for single and multi-talker speech." IEEE/ACM Transactions on audio, speech, and language processing 29 (Jul. 2021). (Year: 2021).*

Alexandre, Enrique, et al. "Speech/music/noise classification in hearing aids using a two-layer classification system with MSE linear discriminants." 2008 16th European Signal Processing Conference. IEEE, 2008. (Year: 2008).*

(Continued)

*Primary Examiner* — Jialong He
(74) *Attorney, Agent, or Firm* — NSIP Law

(57) ABSTRACT

A processor-implemented method includes: extracting a target speaker voice feature based on an input voice of a target speaker; determining an utterance scenario of the input voice based on the target speaker voice feature; generating a final target speaker voice feature based on the determined utterance scenario; and determining whether the target speaker corresponds to a user based on the final target speaker voice feature and a final user voice feature, wherein the determined utterance scenario comprises either one of a single-speaker scenario and a multiple-speaker scenario.

19 Claims, 6 Drawing Sheets

(56) References Cited

U.S. PATENT DOCUMENTS

| | | |
|---|---|---|
| 2020/0135209 A1 | 4/2020 | Delfarah et al. |
| 2020/0160869 A1 | 5/2020 | Heigold et al. |
| 2020/0312336 A1* | 10/2020 | Kang ............... G06N 3/08 |
| 2020/0349230 A1* | 11/2020 | Yoshioka ........... G10L 25/51 |
| 2021/0082438 A1* | 3/2021 | Zhao ............... G10L 17/02 |
| 2021/0217411 A1 | 7/2021 | Moreno et al. |

FOREIGN PATENT DOCUMENTS

| | | |
|---|---|---|
| CN | 112259104 A | 1/2021 |
| CN | 112382298 A | 2/2021 |
| CN | 112466317 A | 3/2021 |
| CN | 112908341 A | 6/2021 |
| KR | 10-2021-0059586 A | 5/2021 |

OTHER PUBLICATIONS

Zhang, Chunlei, Kazuhito Koishida, and John HL Hansen. "Text-independent speaker verification based on triplet convolutional neural network embeddings." IEEE/ACM Transactions on Audio, Speech, and Language Processing 26.9 (2018): 1633-1644. (Year: 2018).*

Kadhim, Hasan Mohammad-Ali. Single channel overlapped-speech detection and separation of spontaneous conversations. Diss. 2018. (Year: 2018).*

Rao, Wei, et al. "Target speaker extraction for overlapped multi-talker speaker verification." arXiv preprint arXiv:1902.02546 vol. 1. (2019).pp 1-5.

"Siri" Wikipedia. 2022. pp 1-14.

"Bixvy (software)" Wikipedia. 2021. pp 1-7.

\* cited by examiner

DEVICE AND METHOD WITH TARGET SPEAKER IDENTIFICATION

CROSS-REFERENCE TO RELATED APPLICATIONS

This application claims the benefit under 35 USC § 119(a) of Chinese Patent Application No. 202111164838.0, filed on Sep. 30, 2021 in the China National Intellectual Property Administration, and Korean Patent Application No. 10-2022-0083342, filed on Jul. 6, 2022 in the Korean Intellectual Property Office, the entire disclosures of which are incorporated herein by reference for all purposes.

BACKGROUND

1. Field

The following description relates to a device and method with target speaker identification.

2. Description of Related Art

Electronic devices may implement operations corresponding to the security of the electronic devices. In particular, an electronic device may be unlocked only when a registered user uses it, preventing people other than the user from using it.

For security of an electronic device, a user's voice may be used as identification information of the user. For example, voiceprint identification technology (or speaker verification technology) may be a technology which uses the user's voice. Voiceprint identification technology may extract the features of the speaker's voice from input voice and use the extracted features.

Voiceprint identification technology may be divided into two processes: voiceprint registration and voiceprint verification. In the registration process, the electronic device may register user information in the electronic device through the user's voice. In the verification process, the electronic device may extract the features of the received voice and compare the extracted features with the features of the a pre-registered user's voice. For example, the electronic device may calculate a similarity value between the features of the extracted voice and those of the pre-registered user's voice. The electronic device may determine that the speaker recognized from the input voice is the same person as the registered user if the calculated similarity value is greater than a threshold value and determine that the speaker recognized from the input voice is a different person from the registered user if the calculated similarity value is less than the threshold value.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes: extracting a target speaker voice feature based on an input voice of a target speaker; determining an utterance scenario of the input voice based on the target speaker voice feature; generating a final target speaker voice feature based on the determined utterance scenario; and determining whether the target speaker corresponds to a user based on the final target speaker voice feature and a final user voice feature, wherein the determined utterance scenario comprises either one of a single-speaker scenario and a multiple-speaker scenario.

The extracting may include: generating an original voice feature based on the input voice; and extracting the target speaker voice feature by inputting the original voice feature and a middle user embedding voice feature to a first network.

The first network may include: a first convolution layer configured to output a speaker extraction embedding feature, for extracting the target speaker voice feature included in the input voice, based on an input of the original voice feature; a splicing layer configured to output a splicing feature based on an input of the speaker extraction embedding feature and the middle user embedding voice feature; a second convolution layer configured to output a mask based on an input of the splicing feature; and a multiplier configured to output the target speaker voice feature based on an input of the mask and the speaker extraction embedding feature.

The determining of the utterance scenario of the input voice may include determining the utterance scenario of the input voice by comparing the original voice feature and the target speaker voice feature.

The determining of the utterance scenario of the input voice by comparing the original voice feature and the target speaker voice feature may include either of: determining the utterance scenario as the single-speaker scenario in response to a mean squared error between the original voice feature and the target speaker voice feature being less than a threshold value; and determining the utterance scenario as the multiple-speaker scenario in response to the mean squared error between the original voice feature and the target speaker voice feature being greater than or equal to the threshold value.

The generating of the final target speaker voice feature may include either of: generating the final target speaker voice feature by inputting the original voice feature to a second network, in response to determining the utterance scenario as the single-speaker scenario; and generating the final target speaker voice feature by inputting the target speaker voice feature to the second network, in response to determining the utterance scenario as the multiple-speaker scenario.

The second network may include: a speaker embedding layer configured to output a target speaker middle embedding voice feature based on an input of either one of the original voice feature and the target speaker voice feature; and an attentive statistics pooling layer configured to output the final target speaker voice feature based on an input of the target speaker middle embedding voice feature.

The determining of whether the target speaker corresponds to the user may include: determining a similarity value between the final target speaker voice feature and the final user voice feature; and determining whether the target speaker corresponds to the user based on the determined similarity value.

The middle user embedding voice feature may be generated as a result of inputting a user voice feature, which is generated based on an input of a user voice, to the speaker embedding layer, and the final user voice feature may be generated as a result of inputting the middle user embedding voice feature to the attentive statistics pooling layer.

The first network and the second network may be trained jointly with a third network for converting a speaker voice feature based on a speaker middle embedding voice feature.

In another general aspect, an electronic device includes: one or more processors configured to: extract a target speaker voice feature based on an input voice of a target speaker; determine an utterance scenario of the input voice based on the target speaker voice feature; generate a final target speaker voice feature based on the determined utterance scenario; and determine whether the target speaker corresponds to the user based on the final target speaker voice feature and a final user voice feature, wherein the determined utterance scenario may include either one of a single-speaker scenario and a multiple-speaker scenario.

For the extracting, the one or more processors may be configured to: generate an original voice feature based on the input voice; and extract the target speaker voice feature by inputting the original voice feature and a middle user embedding voice feature to a first network.

The first network may include: a first convolution layer configured to output a speaker extraction embedding feature, for extracting the target speaker voice feature included in the input voice, based on an input of the original voice feature; a splicing layer which outputs a splicing feature based on an input of the speaker extraction embedding feature and the middle user embedding voice feature; a second convolution layer which outputs a mask based on an input of the splicing feature; and a multiplier which outputs the target speaker voice feature based on an input of the mask and the speaker extraction embedding feature.

For the determining of the utterance scenario of the input voice, the one or more processors may be configured to determine the utterance scenario of the input voice by comparing the original voice feature and the target speaker voice feature.

For the determining of the utterance scenario of the input voice by comparing the original voice feature and the target speaker voice feature, the one or more processors may be configured to: determine the utterance scenario as the single-speaker scenario in response to a mean squared error between the original voice feature and the target speaker voice feature being less than a threshold value; and determine the utterance scenario as the multiple-speaker scenario in response to the mean squared error between the original voice feature and the target speaker voice feature being greater than or equal to the threshold value.

For the generating of the final target speaker voice feature, the one or more processors may be configured to: generate the final target speaker voice feature by inputting the original voice feature to a second network, in response to determining the utterance scenario as the single-speaker scenario; and generate the final target speaker voice feature by inputting the target speaker voice feature to the second network, in response to determining the utterance scenario as the multiple-speaker scenario.

The second network may include: a speaker embedding layer which outputs a target speaker middle embedding voice feature based on an input of either one of the original voice feature and the target speaker voice feature; and an attentive statistics pooling layer which outputs the final target speaker voice feature based on an input of the target speaker middle embedding voice feature.

For the determining of whether the target speaker corresponds to the user, the one or more processors may be configured to: determine a similarity value of the final target speaker voice feature and the final user voice feature; and determine whether the target speaker corresponds to the user based on the determined similarity value.

The middle user embedding voice feature may be generated as a result of inputting a user voice feature, which is generated based on an input user voice, to the speaker embedding layer, and the final user voice feature may be generated as a result of inputting the middle user embedding voice feature to the attentive statistics pooling layer.

The first network and the second network may be trained jointly with a third network for converting a speaker's voice feature based on a speaker's middle embedding voice feature.

In another general aspect, a processor-implemented method includes: extracting a target speaker voice feature based on an original voice feature of a target speaker; comparing the original voice feature and the target speaker voice feature; selecting either the original voice feature or the target speaker voice feature, based on a result of the comparing; generating a final target speaker voice feature based on the selected voice feature; and determining whether the target speaker corresponds to a user based on the final target speaker voice feature and a final user voice feature.

Other features and aspects will be apparent from the following detailed description, the drawings, and the claims.

Figure 1:
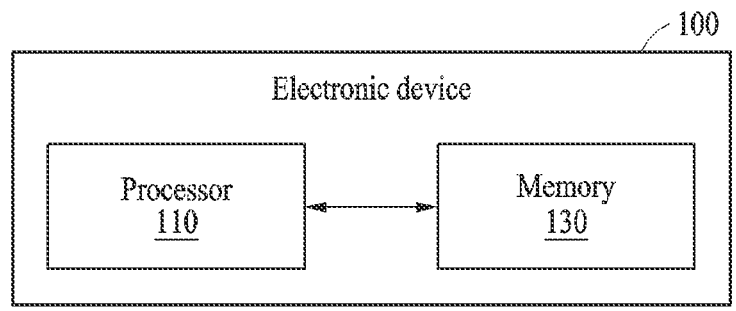
FIG. 1 illustrates an example of an electronic device which identifies a target speaker.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, devices, and/or systems described herein. However, various changes, modifications, and equivalents of the methods, devices, and/or systems described herein will be apparent after an understanding of the disclosure of this application. For example, the sequences of operations described herein are merely examples, and are not limited to those set forth herein, but may be changed with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, devices, and/or systems described herein that will be apparent after the disclosure of this application is understood.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms (e.g., "first," "second," and "third"). Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween. Likewise, similar expressions, for example, "between" and "immediately between," and "adjacent to" and "immediately adjacent to," are also to be construed in the same way.

The terminology used herein is for describing various examples only and is not to be used to limit the disclosure. The singular forms are intended to include the plural forms as well, unless the context clearly indicates otherwise. The terms "comprises," "includes," and "has" describe the presence of stated features, numbers, operations, components, elements, and/or combinations thereof, but do not preclude the presence or addition of one or more other features, numbers, operations, components, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms including technical and scientific terms used herein have the same meaning as commonly understood by one of ordinary skill in the art to which example embodiments belong and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

When describing of the examples, when it is determined that detailed descriptions of well-known related structures or functions obscure the present disclosure, the detailed description thereof will be omitted.

Hereinafter, examples will be described in detail with reference to the accompanying drawings. When describing the example embodiments with reference to the accompanying drawings, like reference numerals refer to like elements and a repeated description related thereto will be omitted.

FIG. 1 illustrates an example of an electronic device which identifies a target speaker.

According to an example, an electronic device 100 may be a locked device for security. The electronic device 100 may unlock the electronic device 100 by comparing pre-registered information of a user's voice and information of a newly received voice. The electronic device 100 may extract information of a target speaker's voice based on an input voice and determine whether the target speaker is identical or corresponds to the pre-registered user based on the information of the target speaker's voice. The target speaker may be identified from the input voice and a verification target. The electronic device 100 may provide a technology for accurately identifying and verifying a complex voice through an end-to-end model. The electronic device 100 may provide a technology for recognizing and verifying the target speaker even when the input voice does not include a predetermined keyword.

Referring to FIG. 1, the electronic device 100 may include a processor 110 (e.g., one or more processors) and a memory 130 (e.g., one or more memories), according to one or more embodiments. The processor 110 may process data stored in the memory 130. The processor 110 may execute computer-readable instructions stored in the memory 130, and instructions triggered by the processor 110. The processor 110 may be a hardware-implemented data processing device with a physically structured circuit to execute desired operations. The desired operations may include, for example, code or instructions in a program. For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

According to one or more embodiments, the memory 130 may store data for an operation or an operation result. The memory 130 may store instructions (or programs) executable by the processor 110. For example, the instructions may include instructions for executing an operation of the processor 110 and/or an operation of each component of the processor 110. The memory 130 may be implemented as a volatile memory device or a non-volatile memory device. The volatile memory device may be implemented as dynamic random access memory (DRAM), static random access memory (SRAM), thyristor RAM (T-RAM), zero capacitor RAM (Z-RAM), or twin transistor RAM (TTRAM). The non-volatile memory device may be implemented as electrically erasable programmable read-only memory (EEPROM), flash memory, magnetic RAM (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, a molecular electronic memory device, and/or insulator resistance change memory. The memory 130 may store data. The memory 130 may be or include a non-transitory computer-readable storage medium storing instructions that, when executed by the processor 110, configure the processor 110 to perform any one, any combination, or all of the operations and methods described herein with references to FIGS. 1-7.

According to one or more embodiments, the memory 130 may store information related to a user of the electronic device 100. The information related to the user of the electronic device 100 may include a user's middle embedding voice feature (e.g., a middle user embedding voice feature) and a user's final voice feature (e.g., a final user voice feature). Hereinafter, a non-limiting example of a target speaker identification operation of the processor 110 will be described in detail.

According to one or more embodiments, the processor 110 may extract the target speaker's voice feature (e.g., a target speaker voice feature) based on the input voice. The processor 110 may acquire (e.g., determine) an original voice feature based on the input voice, and the processor 110 may enter (or input) the original voice feature and the user's middle embedding voice feature (e.g., the pre-stored user's middle embedding voice feature) in (or to) a first network to extract the target speaker's voice feature.

According to one or more embodiments, the input voice may be a voice input for the use of the electronic device 100. The input voice may be generated in various utterance scenarios. For example, the input voice may be generated by a single speaker in a single-speaker scenario. As another example, the input voice may be generated by multiple speakers in a multiple-speaker scenario. Accordingly, the input voice may include a single speaker's voice or the voices of multiple speakers.

According to one or more embodiments, the target speaker may be a speaker to be identified and verified from the input voice. The target speaker may correspond to a verification target which is verified as being identical or corresponding to the user of the electronic device 100. For example, in a single-speaker scenario, the target speaker may be the corresponding one. As another example, in a multiple-speaker scenario, the target speaker may be any one of a plurality of speakers. The target speaker may be a verification target and may be a speaker having features similar to those of a registered user.

According to one or more embodiments, the user's middle embedding voice feature may be a feature of the pre-registered user. The user's middle embedding voice feature may be for extracting information about the target speaker from the input voice. The original voice feature and the target speaker's voice feature may be voice features configured for each frame (e.g., each frame among frames generated over time). When the length of the voice (e.g., the length on the time axis) is long, the size of data corresponding to the voice feature may also be large. For example, the original voice feature and the target speaker's voice feature may be Mel-scale Frequency Cepstral Coefficients (MFCC). As another example, the original voice feature and the target speaker's voice feature may be a FilterBank feature. However, these are only examples, and the present invention is not limited thereto. A non-limiting example of an operation in which the processor 110 acquires the target speaker's voice feature is described in detail with reference to FIG. 2.

According to one or more embodiments, the processor 110 may determine an utterance scenario of the input voice based on the target speaker's voice feature. The utterance scenario of the input voice may be or include a single-speaker scenario and/or a multiple-speaker scenario. The processor 110 may determine the utterance scenario of the input voice by comparing the original voice feature and the target speaker's voice feature. The processor 110 may determine the utterance scenario as the single-speaker scenario when a mean squared error (MSE) between the original voice feature and the target speaker's voice feature is less than a threshold value (e.g., a first threshold value). The processor 110 may determine the utterance scenario as the multiple-speaker scenario when the mean squared error between the original voice feature and the target speaker's voice feature is greater than or equal to the threshold value. By determining the utterance scenario of the input voice based on the difference between the target speaker's voice feature and the original voice feature, the processor 110 of one or more embodiments may more efficiently determine the utterance scenario of the input voice compared to a typical processor. The processor 110 may select an input suitable for a second network 300 (e.g., a second neural network) by determining whether the utterance input scenario of the input voice is a single-speaker scenario or a multiple-speaker scenario. The processor 110 may ensure voiceprint verification performance in a multiple-speaker scenario and may also ensure voiceprint verification performance in a single-speaker scenario. The processor 110 may provide a high-performance voiceprint verification service to the user.

According to one or more embodiments, the processor 110 may obtain (e.g., generate) a target speaker's final voice feature (e.g., a final target speaker voice feature) based on the determined utterance scenario. The processor 110, in response to the single-speaker scenario, may obtain the target speaker's final voice feature by inputting the original voice feature to the second network. The processor 110, in response to the multiple-speaker scenario, may obtain the target speaker's final voice feature by inputting the target speaker's voice feature to the second network. The target speaker's final voice feature may have a fixed size regardless of the length of the voice. The target speaker's final voice feature may be a one-dimensional vector. For example, the size of the target speaker's final voice feature may be set as 1×128, 1×256, or 1×512. A non-limiting example of an operation of acquiring the target speaker's final voice feature is described in detail with reference to FIG. 3.

According to one or more embodiments, the processor 110 may determine whether the target speaker corresponds to the user based on the target speaker's final voice feature and the user's final voice feature. The processor 110 may calculate (e.g., determine) a similarity value between the target speaker's final voice feature and the user's final voice feature and determine whether the target speaker corresponds to the user based on the calculated similarity value. For example, when the similarity value (e.g., a cosine similarity value) is greater than a threshold value (e.g., a second threshold value different than the first threshold value), the processor 110 may determine that the target speaker corresponds to the user. As another example, when the similarity value is less than or equal to the threshold value, the processor 110 may determine that the target speaker does not correspond to the user. Hereinafter, non-limiting examples of the configuration and operation of the first network and the second network will be described in detail.

Figure 2:
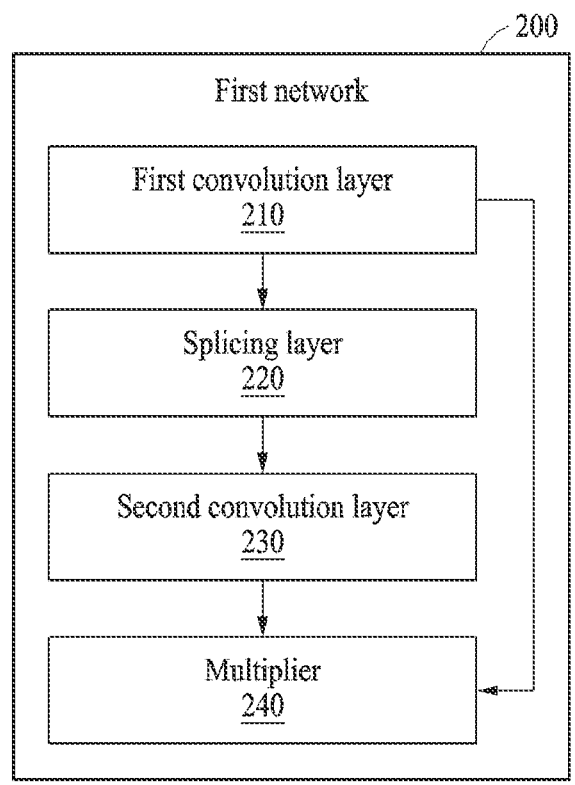
FIG. 2 illustrates an example of a neural-network-based speaker voice extraction model.

FIG. 2 illustrates an example of a neural-network-based speaker voice extraction model.

Referring to FIG. 2, according to one or more embodiments, a processor (e.g., the processor 110 of FIG. 1) may extract a target speaker's voice feature from an input voice based on a first network 200 (e.g., a first neural network). The first network 200 may include a first convolution layer 210, a splicing layer 220, a second convolution layer 230, and a multiplier 240.

According to one or more embodiments, the first convolution layer 210 may receive the original voice feature (e.g., determined based on the input voice) and output a speaker extraction embedding feature for extracting the speaker's voice feature included in the input voice (e.g., using the first convolution layer 210, the processor may generate the speaker extraction embedding feature based on the original voice feature). The splicing layer 220 may receive the speaker extraction embedding feature and the user's middle embedding voice feature, to output the splicing feature (e.g., using the splicing layer 220, the processor may generate the splicing feature based on the speaker extraction embedding feature and the user's middle embedding voice feature). The user's middle embedding voice feature may be a feature of a pre-stored user and may be for extracting information of a target speaker from the input voice. The second convolution layer 230 may receive the splicing feature and output a mask (e.g., using the second convolution layer 230, the processor may generate the mask based on the splicing feature). The second convolution layer 230 may be a fully convolution layer and may include a plurality of 1D-convolution layers. Optionally, a normalization layer may be added between the splicing layer 220 and the second convolution layer 230 to normalize the splice feature. The multiplier 240 may receive the mask and the speaker extraction embedding feature and output the target speaker's voice feature (e.g., using the multiplier 240, the processor may generate the target speaker's voice feature based on the mask and the speaker extraction embedding feature). The target speaker may be a speaker to be identified and verified in the input voice, and the target speaker's voice feature may be a voice feature configured for each frame (e.g., a frame generated over time).

Figure 3:
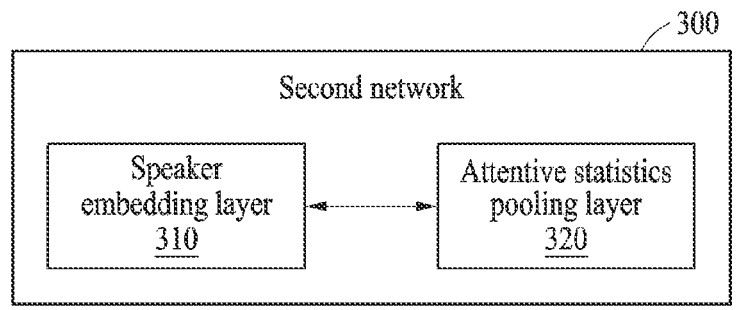
FIG. 3 illustrates an example of a neural-network-based speaker verification model.

FIG. 3 illustrates an example of a neural-network-based speaker-verification model.

Referring to FIG. 3, according to one or more embodiments, a processor (e.g., the processor 110 of FIG. 1) may obtain the target speaker's final voice feature based on the original voice feature and the target speaker's voice feature, based on the second network 300. The second network 300 may include a speaker embedding layer 310 and an attentive statistics pooling layer 320.

According to one or more embodiments, the speaker embedding layer 310 may receive the original voice feature or the target speaker's voice feature to output the target speaker's middle embedding voice feature (e.g., using the speaker embedding layer 310, the processor may generate the target speaker's middle embedding voice feature based on the original voice feature or the target speaker's voice feature). The speaker embedding layer 310 may be configured using a sequeeze and excitation (SE) block, a ResNet block, or a time delay neural network (TDNN). However, the above examples are only examples, and the present invention is not limited thereto. The speaker embedding layer 310 may be other commonly used neural networks or a combination thereof.

The attentive statistics pooling layer 320 may receive the target speaker's middle embedding voice feature (e.g., a middle user embedding voice feature) and output the target speaker's final voice feature (e.g., using the attentive statistics pooling layer 320, the processor may generate the target speaker's final voice feature based on the target speaker's middle embedding voice feature). The target speaker's final voice feature may have a fixed size regardless of the length of the voice. For example, the target speaker's final voice feature may be a one-dimensional vector.

According to one or more embodiments, the processor 110 may select an input (e.g., the original voice feature or the target speaker's voice feature) suitable for the second network 300 by determining whether an utterance scenario of the input voice is a single-speaker scenario or a multiple-speaker scenario. For example, the processor 110 may determine the utterance scenario as the single-speaker scenario when a mean squared error between the original voice feature and the target speaker's voice feature is less than the first threshold value, and may select the original voice feature to be input to the speaker embedding layer 310 in response to determining the single-speaker scenario. Further, the processor 110 may determine the utterance scenario as the multiple-speaker scenario when the mean squared error is greater than or equal to the first threshold value, and may select the target speaker's voice feature to be input to the speaker embedding layer 310 in response to determining the multiple-speaker scenario. Accordingly, the processor 110 of one or more embodiments may ensure and improve voiceprint verification performance in a multiple-speaker scenario and may also ensure and improve voiceprint verification performance in a single-speaker scenario. The processor 110 may provide a high-performance voiceprint verification service to the user.

According to one or more embodiments, the processor 110 may acquire the user's middle embedding voice feature and the user's final voice feature based on the second network 300. The user's middle embedding voice feature and the user's final voice feature may be obtained in the voiceprint registration step. The user's middle embedding voice feature may be obtained as a result of inputting the user's voice feature into the speaker embedding layer 310. The user's middle embedding voice feature may be used when extracting the target speaker's voice feature. The user's final voice feature may be obtained as a result of inputting the user's middle embedding voice feature into the attentive statistics pooling layer 320. The user's final voice feature may be used when verifying that the input voice includes the user's voice.

Figure 4:
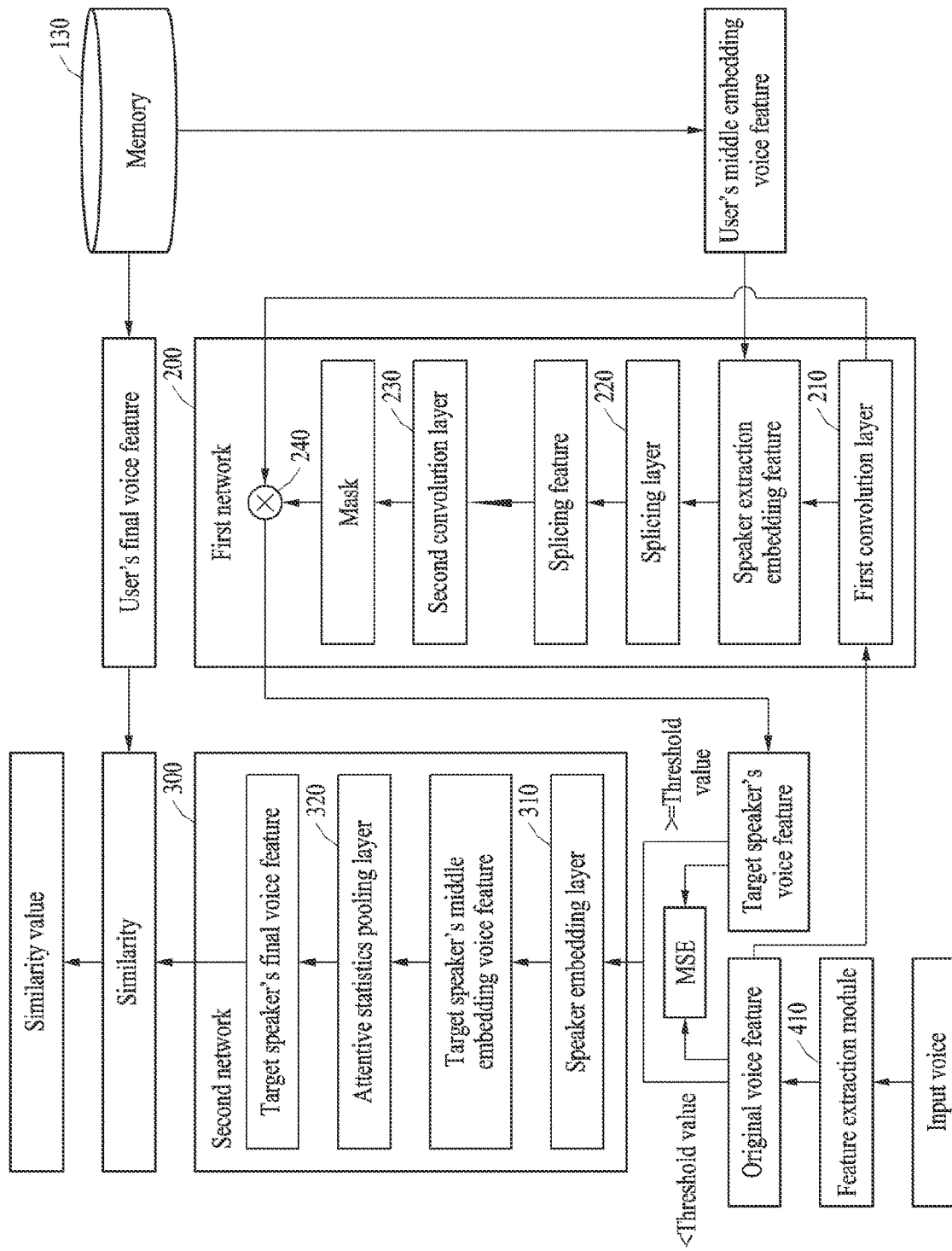
FIG. 4 illustrates an example of identifying a target speaker based on an input voice.

FIG. 4 illustrates an example of identifying a target speaker based on an input voice.

Referring to FIG. 4, according to one or more embodiments, a processor (e.g., the processor 110 of FIG. 1) may obtain the original voice feature from the input voice based on the feature extraction module 410. The input voice may be a voice input for the use of the electronic device 100. The input voice may be generated in various utterance scenarios, and the input voice may include a single-speaker's voice or the voices of multiple-speakers.

According to one or more embodiments, the processor 110 may obtain the target speaker's voice feature from the original voice feature and the user's middle embedding voice feature based on the first network 200. The target speaker may be a speaker to be identified and verified from the input voice. The target speaker may correspond to a verification target which is verified as being identical to the user of the electronic device 100. The target speaker may be a verification target and may be a speaker having features similar to those of a registered user. The original voice feature and the target speaker's voice feature may be voice features configured for each frame (e.g., a frame generated over time). When the length of the voice (e.g., the length on the time axis) is long, the size of data corresponding to the voice feature may also be large. For example, the original voice feature and the target speaker's voice feature may be Mel-scale Frequency Cepstral Coefficients (MFCC) or a FilterBank feature. However, the above examples are only examples, and the present invention is not limited thereto.

According to one or more embodiments, the first network 200 may include the first convolution layer 210, the splicing layer 220, the second convolution layer 230, and the multiplier 240. The first convolution layer 210 may receive the original voice feature and output a speaker extraction embedding feature for extracting the speaker's voice feature included in the input voice. The splicing layer 220 may receive the speaker extraction embedding feature and the user's middle embedding voice feature and output the splicing feature. The user's middle embedding voice feature may be a feature of a pre-stored user and may be for extracting information of a target speaker from the input voice. The second convolution layer 230 may receive the splicing feature and output a mask. The multiplier 240 may receive the mask and the speaker extraction embedding feature and output the target speaker's voice feature.

According to one or more embodiments, the processor 110 may determine the utterance scenario of the input voice based on the original voice feature and the target speaker's voice feature. The utterance scenario of the input voice may include a single-speaker scenario and/or a multiple-speaker scenario. The processor 110 may determine the utterance scenario of the input voice by comparing the original voice feature and the target speaker's voice feature. The processor 110 may determine the utterance scenario as a single-speaker scenario when a mean squared error between the original voice feature and the target speaker's voice feature is less than the threshold value. The processor 110 may determine the utterance scenario as a multiple-speaker scenario when the mean squared error between the original voice feature and the target speaker's voice feature is greater than or equal to the threshold value. By determining the utterance scenario of the input voice based on the difference between the target speaker's voice feature and the original voice feature, the processor 110 of one or more embodiments may more efficiently determine the utterance scenario of the input voice compared to a typical processor.

According to one or more embodiments, the processor 110 may obtain the target speaker's final voice feature based on the determined utterance scenario. The processor 110, in response to the single-speaker scenario, may obtain the target speaker's final voice feature by inputting the original voice feature to the second network 300. The processor 110, in response to the multiple-speaker scenario, may obtain the target speaker's final voice feature by inputting the target speaker's voice feature to the second network 300. The target speaker's final voice feature may have a fixed size regardless of the length of the voice. The target speaker's final voice feature may be a one-dimensional vector. For example, the size of the target speaker's final voice feature may be set as 1×128, 1×256, or 1×512.

According to one or more embodiments, the second network 300 may include the speaker embedding layer 310 and the attentive statistics pooling layer 320. The speaker embedding layer 310 may receive the original voice feature or the target speaker's voice feature and output a target speaker's middle embedding voice feature. The attentive statistics pooling layer 320 may receive the target speaker's middle embedding voice feature and output the target speaker's final voice feature. The target speaker's final voice feature may have a fixed size regardless of the length of the voice.

According to one or more embodiments, the processor 110 may determine whether the target speaker corresponds to the user based on the target speaker's final voice feature and the user's final voice feature. The processor 110 may calculate a similarity value between the target speaker's final voice feature and the user's final voice feature and determine whether the target speaker corresponds to the user based on the calculated similarity value. For example, when the similarity value (e.g., a cosine similarity value) is greater than the threshold value, the processor 110 may determine that the target speaker corresponds to the user. As another example, when the similarity value is less than or equal to the threshold value, the processor 110 may determine that the target speaker does not correspond to the user. The processor 110 may provide a technology for accurately identifying and verifying a complex voice through an end-to-end model. The end-to-end model may include the first network 200 and the second network 300 described above. The first network 200 and the second network 300 may be trained jointly with a third network for converting a speaker's voice feature based on a speaker's middle embedding voice feature. Hereinafter, the learning of the networks will be described.

Figure 5:
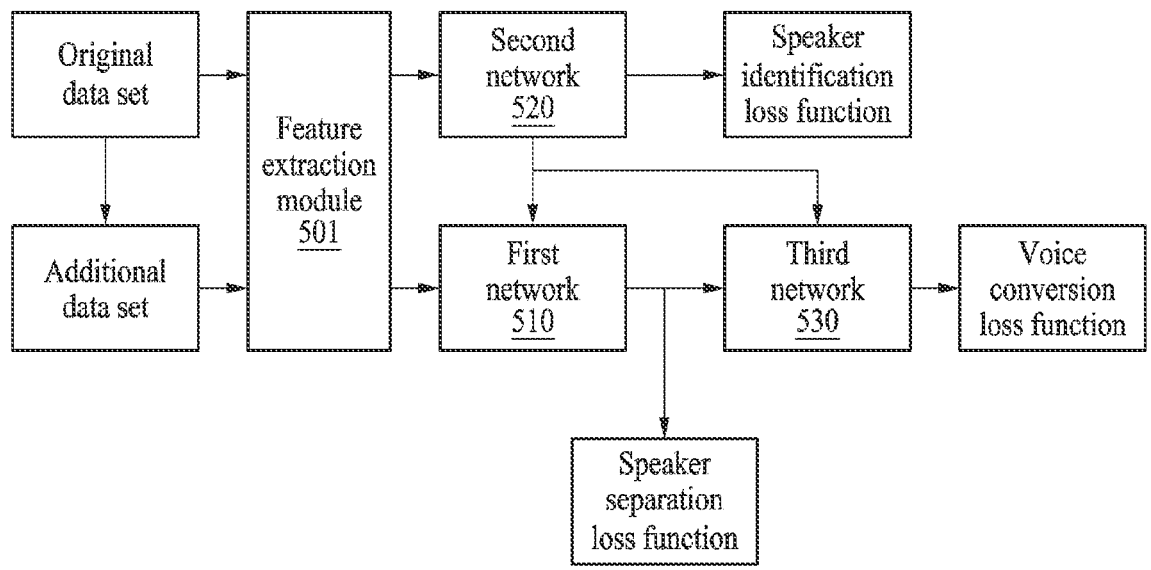
FIG. 5 illustrates an example of a learning of neural-network-based models.
Figure 6:
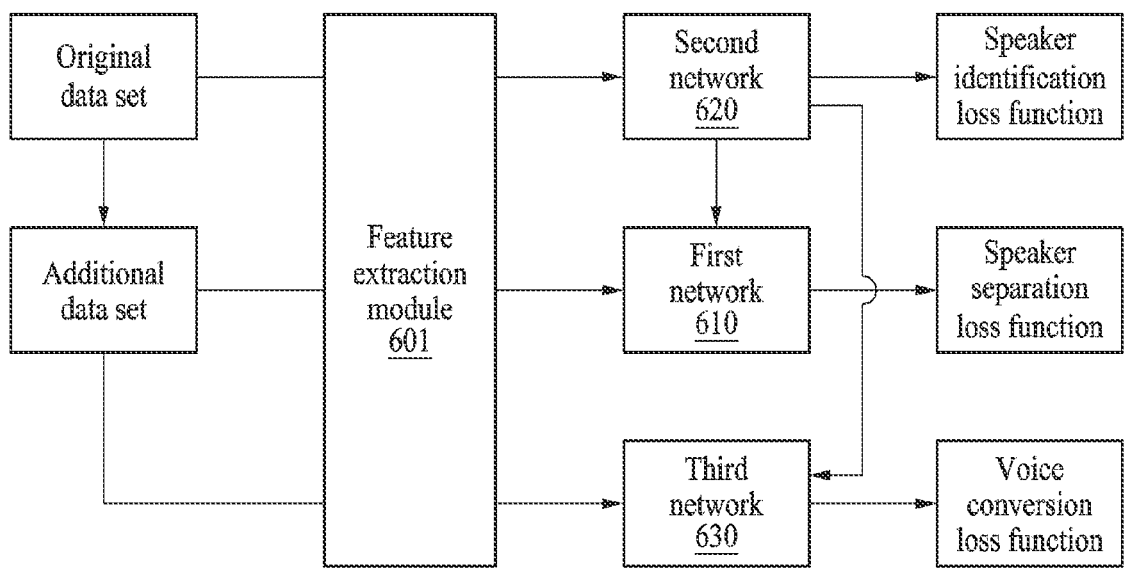
FIG. 6 illustrates an example of a learning of neural-network-based models.

FIG. 5 illustrates an example of a learning of neural-network-based models, and FIG. 6 illustrates an example of a learning of neural-network-based models.

Referring to FIG. 5, a first network 510, a second network 520, and a third network 530 may be jointly trained (e.g., learned). The first network 510 and the second network 520 may be trained by supervised learning, and the third network 530 may be trained by self-supervised learning. The first network 510 may be a model for extracting the speaker's voice. The second network 520 may be a model for performing speaker identification. The third network may be a model for converting the speaker's voice. In the training process, the first network 510 may use a speaker separation loss function, the second network 520 may use a speaker identification loss function, and the third network 530 may use a voice conversion loss function. The first network 510, the second network 520, and the third network 530 may be trained to minimize a speaker separation loss of the first network 510, a speaker identification loss of the second network 520, and a voice conversion loss of the third network 530. By updating the end-to-end deep learning network considering the speaker separation loss, the speaker identification loss, and the voice conversion loss, the training process of one or more embodiments may improve an identification performance and generalization performance of the trained first network 510 (e.g., the first network 200 of FIG. 2) and the trained second network 520 (e.g., the second network 300 of FIG. 2) compared to a typical training process. It should be understood that while the third network 530 may be used in the training process for improving the performance of the first network 510 and the second network 520, the third network 530 may not be used in the identification process.

A processor (e.g., the processor 110 of FIG. 1) may jointly train the first network 510, the second network 520, and the third network 530 using an original data set and an additional data set. The original data set may include a plurality of voices and speaker tags corresponding to each of the plurality of voices. Each of the plurality of voices may include a single-speaker's voice.

The processor 110 may generate an additional data set based on the original data set. The additional data set may be a combination of at least two of the plurality of voices included in the original data set. For example, the processor 110 may select a voice C of the first speaker and a voice D of the second speaker from the original data set, and combine the two voices to obtain the voice M. For example, the voice M may be a direct combination of the voice C and the voice D, and the voice C may be used as a tag for the voice M. The tagging of information corresponding to a newly generated voice may be performed automatically. That is, the additional data set may be automatically generated in the self-supervised learning process. Therefore, the processor 110 may train the network without increasing the amount of data and annotations.

The processor 110 may optionally perform preprocessing (e.g., random clipping, addition of noise, addition of reverberation, volume enhancement, etc.) on the generated additional data set.

The processor 110 may perform voice feature extraction through a feature extraction module 501. For example, the processor 110 may extract the original voice feature of the original data set through the feature extraction module 501 and extract the original voice feature of the additional data set through the feature extraction module 501.

The processor 110 may perform a speaker identification operation through the second network 520. The input of the second network 520 may be an original voice feature extracted from the speaker's voice (e.g., a voice included in the original data set). The speaker identification loss function may be based on a metric learning loss. The processor 110 may update the second network 520 to minimize speaker identification loss by adjusting the intra-class spacing.

The processor 110 may extract the speaker's voice through the first network 510. The input of the first network 510 may be the original voice feature extracted from the voices of multiple-speakers (e.g., a voice included in the additional data set) and the speaker's middle embedding voice feature output from by the second network 520. For example, the original voice feature may be extracted from the combined voice of the first speaker and the second speaker, and the speaker's middle embedding voice feature may be a vector based on the first speaker's voice. In this case, the target speaker may be the first speaker. The processor 110 may update the second network 520 to minimize speaker separation loss by performing backpropagation.

The processor 110 may perform a voice conversion through the third network 530. The third network may include an Adaptive Instance Normalization (AdaIN) network for converting a voice. The Adaptive Instance Normalization network may receive two inputs. One of the inputs may be a voice feature to be transformed, and the other one of the inputs may be a reference voice feature for conversion. The Adaptive Instance Normalization network may be illustrated by Equation 1 below, for example.

$$AdaIN(x, y) = \sigma(y)\left(\frac{x - \mu(x)}{\sigma(x)}\right) + \mu(y) \qquad \text{Equation 1}$$

In Equation 1, $\mu(x)$ and $\sigma(x)$ denote the mean and standard deviation of the voice feature to be transformed, respectively, and $\mu(y)$ and $\sigma(y)$ may be the mean and standard deviation of reference voice features for conversion, respectively. For example, the third network 530 may convert a voice feature based on a vector based on the first speaker's voice (e.g., a first speaker's middle embedding voice feature) and the feature of the first speaker's voice. The vector based on the first speaker's voice may be a reference voice feature for conversion, and the voice feature of the first speaker may be a voice feature to be converted. The processor 110 may update the third network 530 to minimize voice conversion loss by performing backpropagation. The third network 530 may be updated jointly with the second network 520.

Each network described with reference to FIG. 5 may be substantially similar to each network of FIG. 6. That is, the description of each network described with reference to FIG. 5 may also be applied to each network of FIG. 6. Therefore, repeated descriptions have been omitted to avoid repetition.

Referring to FIG. 6, the network structure of FIG. 6 may be a parallel network structure. The network structure of FIG. 5 may be a serial network structure. Although exemplary configurations (i.e., serial and parallel) of a network structure are disclosed in FIGS. 5 and 6, the present invention is not limited thereto, and each network may be connected and/or configured in a different manner.

Figure 7:
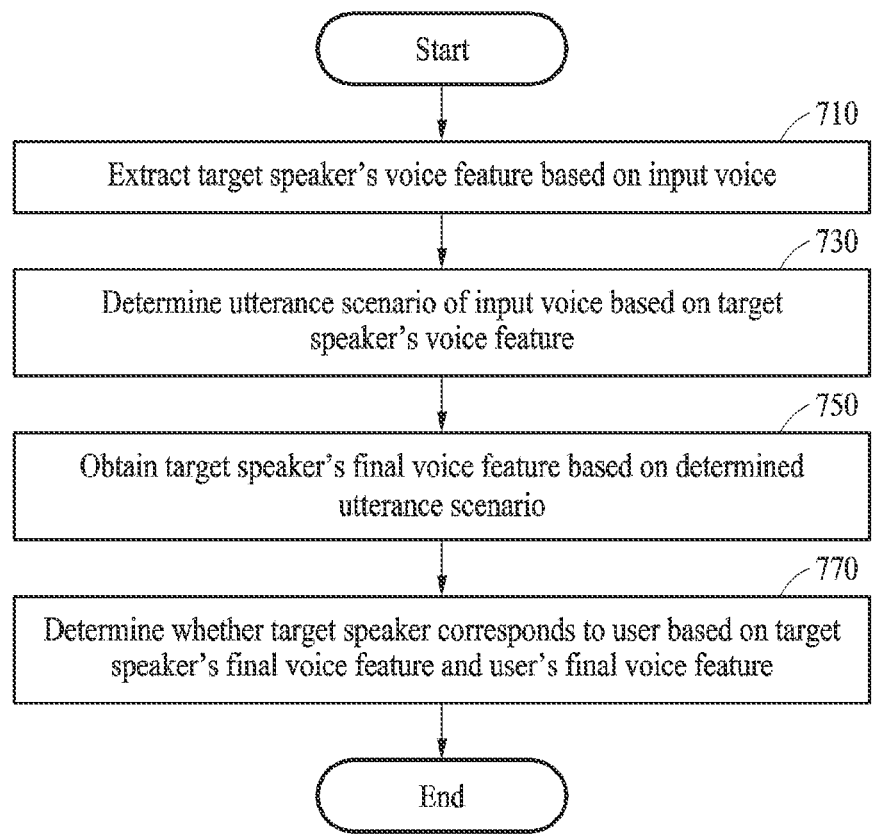
FIG. 7 illustrates an example of identifying a target speaker.

FIG. 7 illustrates an example of identifying a target speaker.

Operations 710 to 770 may be performed sequentially, but are not necessarily performed sequentially. For example, the order of operations 710 to 770 may be changed, and at least two of operations 710 to 770 may be performed in parallel or simultaneously. Further, one or more of operations 710 to 770 may be omitted, without departing from the spirit and scope of the shown example. Operations 710 to 770 may be performed by a processor (e.g., the processor 110 of FIG. 1) described above, and in addition to the description of FIG. 7 below, the descriptions of FIGS. 1-6 are also applicable to FIG. 7 and are incorporated herein by reference. Therefore, repeated descriptions have been omitted.

In operation 710, the processor 110 may extract the target speaker's voice feature based on the input voice.

In operation 730, the processor 110 may determine an utterance scenario of the input voice based on the features of the target speaker's voice.

In operation 750, the processor 110 may obtain the target speaker's final voice feature based on the determined utterance scenario.

In operation 770, the processor 110 may determine whether the target speaker corresponds to the user based on the target speaker's final voice feature and the final feature of the user's voice.

The electronic devices, processors, memories, electronic device 100, processor 110, memory 130, and other apparatuses, units, modules, devices, and components described herein with respect to FIGS. 1-7 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:
    generating an original voice feature based on an input voice of a target speaker;
    extracting, by a first neural network, a target speaker voice feature based on the original voice feature;
    determining whether an utterance scenario of the input voice is a single-speaker scenario or a multiple-speaker scenario by comparing the original voice feature with the target speaker voice feature;
    generating, by inputting the original voice feature or the extracted target speaker feature into a second neural network, using a result of the determination of the utterance scenario, a final target speaker voice feature; and
    generating a user verification result by determining whether the target speaker corresponds to a user by comparing the final target speaker voice feature with a final user voice feature, wherein the determined utterance scenario comprises a single-speaker scenario and a multiple-speaker scenario.

2. The method of claim 1, wherein the extracting of the target speaker voice feature comprises:
inputting the original voice feature and a middle user embedding voice feature to the first neural network.

3. The method of claim 2, wherein the first neural network comprises:
a first convolution layer configured to output a speaker extraction embedding feature, for extracting the target speaker voice feature included in the input voice, based on an input of the original voice feature;
a splicing layer configured to output a splicing feature based on an input of the speaker extraction embedding feature and the middle user embedding voice feature;
a second convolution layer configured to output a mask based on an input of the splicing feature; and
a multiplier configured to output the target speaker voice feature based on an input of the mask and the speaker extraction embedding feature.

4. The method of claim 1, wherein the determining of the utterance scenario of the input voice by comparing the original voice feature and the target speaker voice feature comprises either of:
in response to a mean squared error between the original voice feature and the target speaker voice feature being less than a threshold value, determining the utterance scenario as the single-speaker scenario; and
in response to the mean squared error between the original voice feature and the target speaker voice feature being greater than or equal to the threshold value, determining the utterance scenario as the multiple-speaker scenario.

5. The method of claim 1,
wherein, by the second neural network, the generating of the final target speaker voice feature comprises:
in response to determining the utterance scenario as the single-speaker scenario, inputting the original voice feature to the second neural network; and
in response to determining the utterance scenario as the multiple-speaker scenario, inputting the target speaker voice feature to the second neural network.

6. The method of claim 5, wherein the second neural network comprises:
a speaker embedding layer configured to output a target speaker middle embedding voice feature based on an input of either one of the original voice feature and the target speaker voice feature; and
an attentive statistics pooling layer configured to output the final target speaker voice feature based on an input of the target speaker middle embedding voice feature.

7. The method of claim 6, wherein the determining of whether the target speaker corresponds to the user comprises:
determining a similarity value between the final target speaker voice feature and the final user voice feature; and
determining whether the target speaker corresponds to the user based on the determined similarity value.

8. The method of claim 7, wherein
the middle user embedding voice feature is generated as a result of inputting a user voice feature, which is generated based on an input of a user voice, to the speaker embedding layer, and the final user voice feature is generated as a result of inputting the middle user embedding voice feature to the attentive statistics pooling layer.

9. The method of claim 8, wherein the first neural network and the second neural network are trained jointly with a third network for converting a speaker voice feature based on a speaker middle embedding voice feature.

10. An electronic device comprising:
one or more processors;
a memory comprising one or more non-transitory storage media that store instructions that, when executed by the one or more processors, configures the device to:
generate an original voice feature based on an input voice of a target speaker;
extract, by a first neural network, a target speaker voice feature based on the original voice feature;
determine whether an utterance scenario of the input voice is a single-speaker scenario or a multiple-speaker scenario by comparing the original voice feature with the target speaker voice feature;
generate, by inputting the original voice feature or the extracted target speaker feature into a second neural network, using a result of the determination of the utterance scenario, a final target speaker voice feature; and
generate a user verification result by determining whether the target speaker corresponds to a user by comparing the final target speaker voice feature with a final user voice feature,
wherein the determined utterance scenario comprises a single-speaker scenario and a multiple-speaker scenario.

11. The electronic device of claim 10, wherein, for the extracting of the target speaker voice feature, the execution of the instructions further configures the device to:
inputting the original voice feature and a middle user embedding voice feature to the first neural network.

12. The electronic device of claim 11, wherein the first neural network comprises:
a first convolution layer configured to output a speaker extraction embedding feature, for extracting the target speaker voice feature included in the input voice, based on an input of the original voice feature;
a splicing layer which outputs a splicing feature based on an input of the speaker extraction embedding feature and the middle user embedding voice feature;
a second convolution layer which outputs a mask based on an input of the splicing feature; and
a multiplier which outputs the target speaker voice feature based on an input of the mask and the speaker extraction embedding feature.

13. The electronic device of claim 10, wherein, for the determining of the utterance scenario of the input voice by comparing the original voice feature and the target speaker voice feature, the execution of the instructions further configures the device to:
in response to a mean squared error between the original voice feature and the target speaker voice feature being less than a threshold value, determine the utterance scenario as the single-speaker scenario; and
in response to the mean squared error between the original voice feature and the target speaker voice feature being greater than or equal to the threshold value, determine the utterance scenario as the multiple-speaker scenario.

14. The electronic device of claim 13, wherein, for the generating of the final target speaker voice feature, the execution of the instructions further configures the device to:

in response to determining the utterance scenario as the single-speaker scenario, generate the final target speaker voice feature by inputting the original voice feature to the second neural network; and in response to determining the utterance scenario as the multiple-speaker scenario, generate the final target speaker voice feature by inputting the target speaker voice feature to the second neural network.

15. The electronic device of claim 14, wherein the second neural network comprises:

a speaker embedding layer which outputs a target speaker middle embedding voice feature based on the input of either one of the original voice feature and the target speaker voice feature; and an attentive statistics pooling layer which outputs the final target speaker voice feature based on an input of the target speaker middle embedding voice feature.

16. The electronic device of claim 15, wherein, for the determining of whether the target speaker corresponds to the user, the execution of the instructions further configures the device to:

determine a similarity value of the final target speaker voice feature and the final user voice feature; and determine whether the target speaker corresponds to the user based on the determined similarity value.

17. The electronic device of claim 16, wherein the middle user embedding voice feature is generated as a result of inputting a user voice feature, which is generated based on an input user voice, to the speaker embedding layer, and the final user voice feature is generated as a result of inputting the middle user embedding voice feature to the attentive statistics pooling layer.

18. A processor-implemented method, the method comprising:

generating an original voice feature based on an input voice of a target speaker;

extracting, by a first neural network, a target speaker voice feature based on the original voice feature;

comparing the original voice feature and the extracted target speaker voice feature;

selecting, based on a result of the comparing, a first voice feature between the original voice feature and the target speaker voice feature;

generating, by inputting the original voice feature or the extracted target speaker voice feature into a second neural network, using the selected first voice feature representing a single-speaker scenario or a multiple-speakers scenario, a final target speaker voice feature; and generating a user verification result by determining whether the target speaker corresponds to a user by comparing the final target speaker voice feature with a final user voice feature.

19. The method of claim 1, wherein the determining of the utterance scenario of the input voice comprises:

selecting either the original voice feature or the target speaker voice feature, based on a result of the comparing; and generating the final target speaker voice feature based on the selected voice feature.

* * * * *